US009699081B2

(12) United States Patent
Chou

(10) Patent No.: US 9,699,081 B2
(45) Date of Patent: Jul. 4, 2017

(54) GENERATION AND USE OF A USER EQUIPMENT LOCATION DISTRIBUTION IN A WIRELESS COMMUNICATION NETWORK

(71) Applicant: Joey Chou, Scottsdale, AZ (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/779,557

(22) PCT Filed: Mar. 25, 2014

(86) PCT No.: PCT/US2014/031768
§ 371 (c)(1),
(2) Date: Sep. 23, 2015

(87) PCT Pub. No.: WO2014/186056
PCT Pub. Date: Nov. 20, 2014

(65) Prior Publication Data
US 2016/0044453 A1  Feb. 11, 2016

Related U.S. Application Data

(60) Provisional application No. 61/824,338, filed on May 16, 2013.

(51) Int. Cl.
H04Q 7/10 (2006.01)
H04L 12/741 (2013.01)
(Continued)

(52) U.S. Cl.
CPC ............ *H04L 45/74* (2013.01); *G01C 21/005* (2013.01); *G01S 19/12* (2013.01);
(Continued)

(58) Field of Classification Search
CPC .... G01S 5/0226; G01S 5/0242; G01S 5/0289; H04W 36/32; H04W 88/085
(Continued)

(56) References Cited

U.S. PATENT DOCUMENTS

2004/0102195 A1* 5/2004 Naghian ................. H04W 4/02
455/456.1
2008/0096566 A1* 4/2008 Brunner ............... C07D 491/04
455/437

(Continued)

FOREIGN PATENT DOCUMENTS

EP          1 081 972 A2    3/2001
WO      2013/062462 A1     5/2013

OTHER PUBLICATIONS

International Search Report and Written Opinion mailed Jun. 27, 2014 from International Application No. PCT/US2014/031768.
(Continued)

Primary Examiner — Ajit Patel
Assistant Examiner — Julio Perez
(74) Attorney, Agent, or Firm — Schwabe, Williamson & Wyatt, P.C.

(57) ABSTRACT

Methods, apparatuses, and systems are described related to generating and using a user equipment (UE) location distribution in a wireless communication network. In embodiments, an evolved Node B (eNB) may determine an angle of arrival (AoA) and a timing advance (Tadv) for individual UEs of a plurality of UEs that are in a connected mode with the eNB. The eNB may assign the individual UEs to one of a plurality of bins to generate a UE location distribution. Individual bins of the plurality of bins may correspond to a range of values for the AoA and a range of values for the Tadv to indicate a physical location of the corresponding UEs. The eNB may transmit the UE location distribution to a network management entity, which may adjust one or more
(Continued)

parameters of the eNB, based on the UE location distribution, using a capacity and coverage optimization (CCO) function.

17 Claims, 9 Drawing Sheets

(51) Int. Cl.
| | | |
|---|---|---|
| *H04W 72/04* | (2009.01) | |
| *H04W 4/02* | (2009.01) | |
| *H04L 12/64* | (2006.01) | |
| *G01C 21/00* | (2006.01) | |
| *G01S 19/12* | (2010.01) | |
| *H04W 28/02* | (2009.01) | |
| *H04W 84/12* | (2009.01) | |
| *H04W 88/06* | (2009.01) | |
| *H04W 16/18* | (2009.01) | |

(52) U.S. Cl.
CPC .......... *H04L 12/6418* (2013.01); *H04W 4/02* (2013.01); *H04W 28/0252* (2013.01); *H04W 72/0433* (2013.01); *H04W 72/0453* (2013.01); *H04W 16/18* (2013.01); *H04W 84/12* (2013.01); *H04W 88/06* (2013.01)

(58) Field of Classification Search
USPC ..................... 455/456.5, 456.2, 456.3, 456.1
See application file for complete search history.

(56) References Cited

U.S. PATENT DOCUMENTS

| | | | |
|---|---|---|---|
| 2009/0286510 A1 | 11/2009 | Huber et al. | |
| 2009/0310501 A1 | 12/2009 | Catovic et al. | |
| 2010/0273504 A1 | 10/2010 | Bull et al. | |
| 2010/0323723 A1 | 12/2010 | Gerstenberger et al. | |
| 2011/0286393 A1* | 11/2011 | Fouren | H04L 12/2807 370/328 |
| 2011/0294499 A1 | 12/2011 | Vikberg et al. | |
| 2012/0178468 A1 | 7/2012 | Jeong et al. | |
| 2013/0040648 A1* | 2/2013 | Yang | H04W 16/18 455/446 |
| 2013/0316727 A1* | 11/2013 | Edge | H04W 4/02 455/456.1 |
| 2014/0241159 A1* | 8/2014 | Kakadia | H04W 24/02 370/235 |
| 2015/0189610 A1 | 7/2015 | Siomina et al. | |

OTHER PUBLICATIONS

Office Action issued Sep. 9, 2016 from Korean Patent Application No. 2015-7029686, 13 pages.
3GPP, "Technical Specification Group Radio Access Network; Evolved Universal Terrestrial Radio Access Network (E-UTRAN); Stage 2 functional specification of User Equipment (UE) positioning in E-UTRAN (Release 11)," 3GPP TS 36.305 V11.3.0 (Mar. 2013), Lte Advanced, 58 pages.
3GPP, "Technical Specification Group Services and System Aspects; Telecommunication management; Study on NM Centralized Coverage and Capacity Optimization (CCO) SON Function (Release 12)," 3GPP TR 32.836 V0.5.0 (May 2013), LTE Advanced, 16 pages.
Extended European Search Report issued Dec. 5, 2016 from European Patent Application No. 14798398.5, 7 pages.
Office Action issued Feb. 27, 2017 from U.S. Appl. No. 15/394,728, 21 pages.
Final Rejection from Korean Patent Application No. 2015-7029686, 7 pages.

\* cited by examiner

GENERATION AND USE OF A USER EQUIPMENT LOCATION DISTRIBUTION IN A WIRELESS COMMUNICATION NETWORK

CROSS REFERENCE TO RELATED APPLICATIONS

The present application claims priority to U.S. Provisional Patent Application No. 61/824,338, filed May 16, 2013, and entitled "ADVANCED WIRELESS COMMUNICATION SYSTEMS AND TECHNIQUES," the entire disclosure of which is hereby incorporated by reference in its entirety.

FIELD

Embodiments of the present invention relate generally to wireless networks and more particularly to generation and use of a user equipment location distribution in wireless networks.

BACKGROUND

A wireless cellular network, such as a Long Term Evolution Advanced (LTE-A) network, network coverage is organized into cells. User equipments (UEs) associated with an individual cell may be connected with a same evolved Node B (eNB) of the network. However, the demand for network resources and/or the physical arrangement of the UEs within the cell may vary over time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for generating and using a user equipment location distribution in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
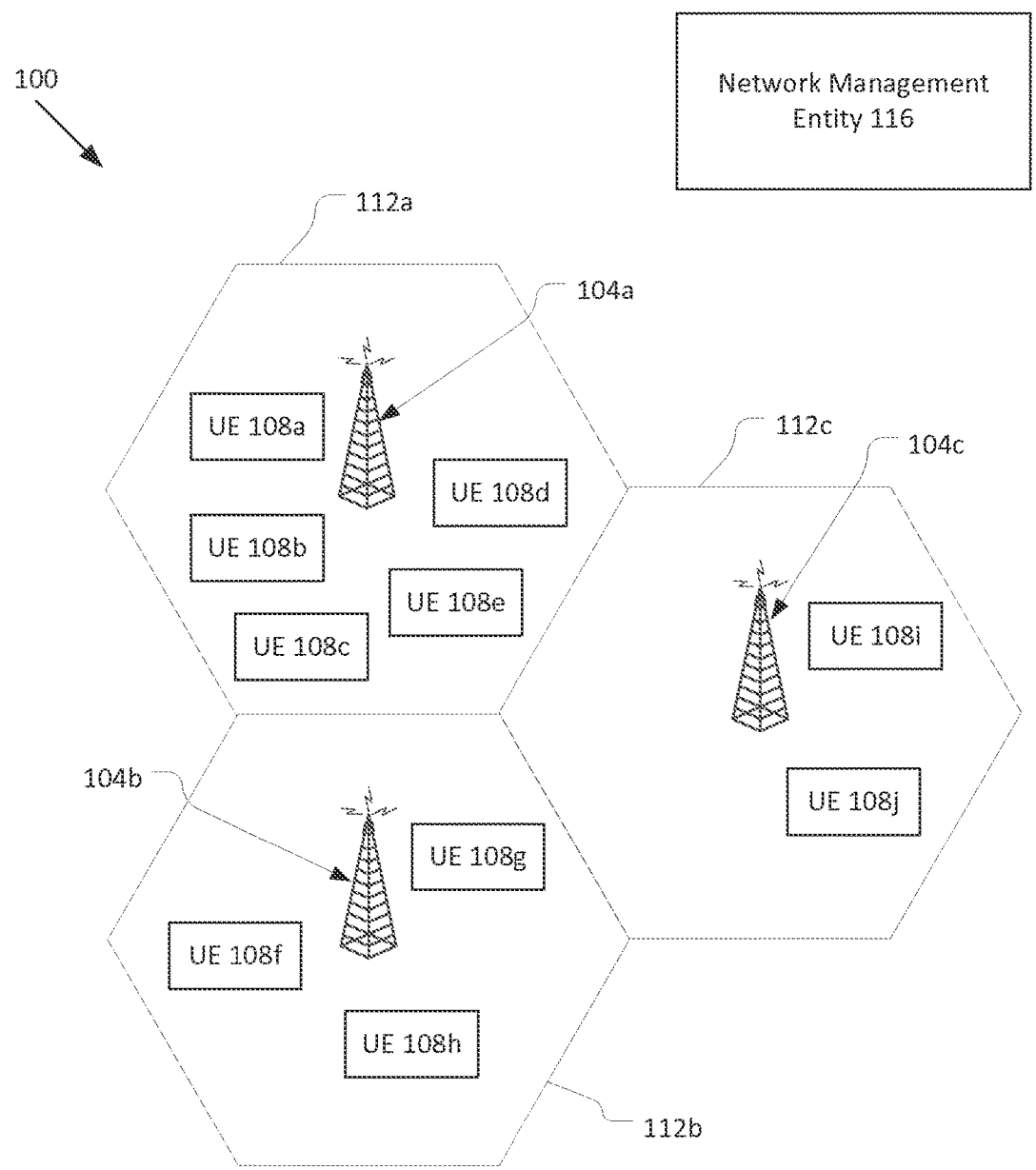
FIG. 1 schematically illustrates a high-level example of a network environment comprising a plurality of evolved Node Bs (eNBs), a plurality of user equipments (UEs), and a network management entity in accordance with various embodiments.

FIG. 1 schematically illustrates a network environment 100 (hereinafter "network 100") in accordance with various embodiments. The network 100 includes a plurality of evolved Node Bs (eNBs) 104a-c of a radio access network (RAN). The individual eNBs 104a-c may communicate wirelessly with one or more user equipments (UEs) 108a-j via an over-the-air (OTA) interface. The RAN may be part of a 3GPP LTE Advanced (LTE-A) network and may be referred to as an evolved universal terrestrial radio access network (EUTRAN). In other embodiments, other radio access network technologies may be utilized.

The individual eNBs 104a-c may provide network services for UEs 108a-j associated with respective cells 112a-c of the network environment 100. UEs 108a-j may be associated with a given cell 112a-c, for example, if they are in a connected mode with the corresponding eNB 104a-c. Although the individual eNBs 104a-c are shown in FIG. 1 to each provide services for a single cell 112a-c, in other embodiments one or more of the eNBs 104a-c may provide network services for multiple cells 112a-c. The cells 112a-c may generally correspond to a geographical area to provide network services for UEs 108a-j located within the geographical area. However, in some embodiments, the geographical areas serviced by different cells 112a-c may overlap.

In various embodiments, the network 100 may further include a network management entity 116. The network management entity 116 may manage communications by one or more of the eNBs 104a-c. In some embodiments, the network management entity may included in a separate device from the one or more eNBs 104a-c. In other embodiments, the network management entity 116 may be included in one of the eNBs 104a-c.

Figure 2:
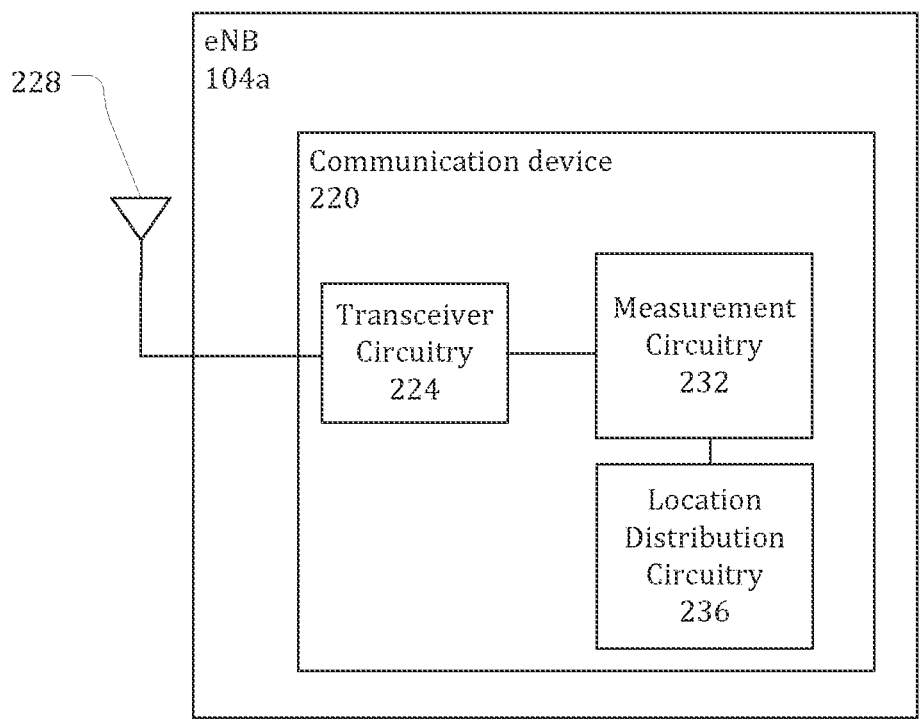
FIG. 2 schematically illustrates a high-level example of an eNB in accordance with various embodiments.

FIG. 2 schematically illustrates the eNB 104a in accordance with various embodiments. The eNB 104b and/or eNB 104c may be similar to the eNB 104a in some embodiments. The eNB 104a may include a communication device 220 that implements various communication protocols in order to effectuate communication with the UEs 108a-e associated with the cell 112a. The communication device 220 may be a chip, chipset, or other collection of programmed and/or preconfigured circuitry. In some embodiments, the communication device 220 may include or be part of baseband circuitry, radio-frequency circuitry, etc.

The communication device 220 may include transceiver circuitry 224 to wirelessly communicate with the UEs 108a-e. The transceiver circuitry 224 may be coupled with one or more antennas 228 of the eNB 104a to transmit wireless signals to, and/or receive wireless signals from, the UEs 108a-e. The communication device 220 may further include measurement circuitry 232 and location distribution circuitry 236 coupled to the transceiver circuitry 224.

Figure 3:
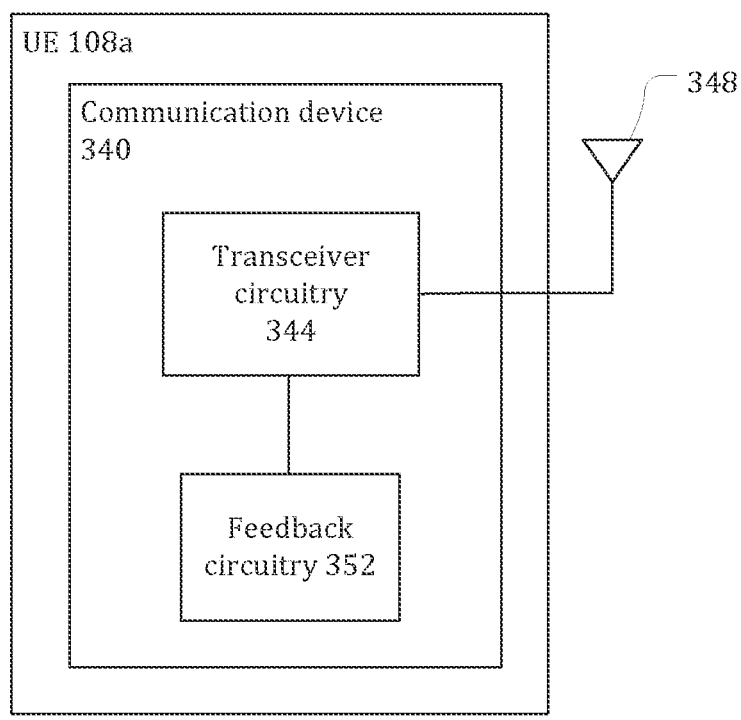
FIG. 3 schematically illustrates a high-level example of a UE in accordance with various embodiments.

FIG. 3 schematically illustrates the UE 108a in accordance with various embodiments. One or more of the UEs 108b-j may be similar to the UE 108a in some embodiments.

The UE 108a may include a communication device 340 that implements various communication protocols in order to effectuate communication with the eNB 104a. The communication device 340 may be a chip, chipset, or other collection of programmed and/or preconfigured circuitry. In some embodiments, the communication device 340 may include or be part of baseband circuitry, radio-frequency circuitry, etc.

The communication device 340 may include transceiver circuitry 344 to wirelessly communicate with the eNB 104a over a wireless communication network (e.g., the RAN). The transceiver circuitry 344 may be coupled with one or more antennas 348 of the UE 108a to transmit wireless signals to, and/or receive wireless signals from, the eNB 104a. The communication device 340 may further include feedback circuitry 352 coupled to the transceiver circuitry 344.

Figure 4:
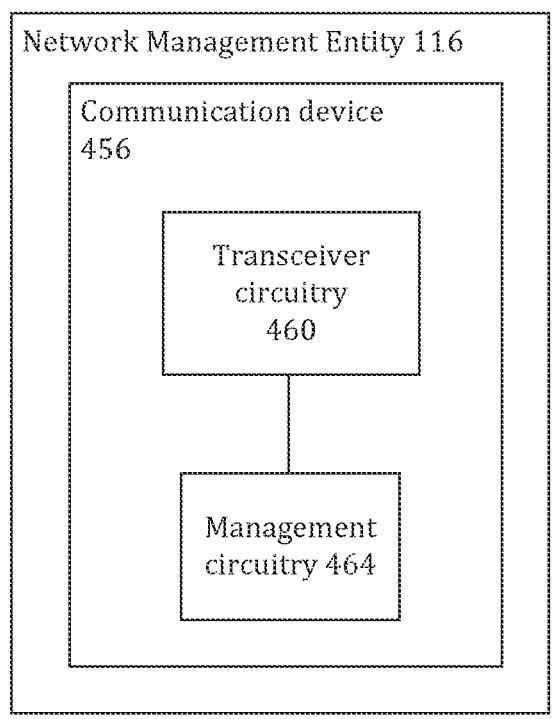
FIG. 4 schematically illustrates a high-level example of a network management entity in accordance with various embodiments.

FIG. 4 schematically illustrates the network management entity 116 in accordance with various embodiments. The network management entity 116 may include a communication device 456 that implements various communication protocols in order to effectuate communication with the eNB 104a. The communication device 456 may be a chip, chipset, or other collection of programmed and/or preconfigured circuitry. In some embodiments, the communication device 456 may communicate with the eNB 104a via a wired interface (e.g., via a wired Internet Protocol (IP) interface). In other embodiments, the communication device 456 may communicate with the eNB 104a via a wireless interface.

The communication device 456 may include transceiver circuitry 460 to communicate with the eNB 104a. The transceiver circuitry 460 may communicate with the eNB 104a via a wired and/or wireless interface. In embodiments in which the transceiver circuitry 460 communicates with the eNB 104a via a wireless interface, the transceiver circuitry 460 may be coupled to one or more antennas (not shown) of the network management entity 116. The communication device 456 may further include management circuitry 464. In various embodiments, the management circuitry 464 may implement a capacity and coverage optimization (CCO) function as further described herein.

In various embodiments, the measurement circuitry 232 of the eNB 104a may determine an angle of arrival (AoA) and a timing advance (Tadv) associated with individual UEs 108a-e within cell 112a. The measurement circuitry 232 may calculate the AoA and/or the Tadv for the individual UE 108a-e based on a signal transmitted by the UE 108a-e and received by the eNB 104a. The measurement circuitry 232 may determine the AoA and Tadv for all of the UEs 108a-e that are associated or connected with the cell 104a.

In various embodiments, the AoA for an individual UE may correspond to an angular direction of the corresponding UE with respect to the eNB 104a. In some embodiments, the AoA may have a value from 0 to 360 degrees.

In some embodiments, the Tadv may include a Type 1 Tadv which corresponds to a sum of an eNB receive-transmit time difference and a UE receive-transmit time difference. The eNB receive-transmit time difference may correspond to a time difference between a time that the eNB 104a transmits a downlink signal scheduled for a time resource of the channel (e.g., a subframe) to the corresponding UE 108a-e and a time that the eNB 104a receives an uplink signal scheduled for the time resource from the corresponding UE 108a-e. The UE receive-transmit time difference may correspond to a time difference between a time that the UE transmits the uplink signal scheduled for the time resource of the channel to the eNB and a time that the UE receives the downlink signal scheduled for the time resource from the eNB.

Alternatively, or additionally, the Tadv may include a Type 2 Tadv which corresponds to the eNB receive-transmit time difference. In some embodiments, the Type 1 Tadv may be used for a UE that is time aligned with the eNB, and the Type 2 Tadv may be used for a UE that is not time aligned with the eNB.

In various embodiments, the Tadv may be in units of time, such as a number of Ts. In some embodiments, one Ts may be equal to $1/(15000 \times 2048)$ second. The Tadv may generally correspond to a distance of the corresponding UE from the eNB 104a.

In some embodiments, the individual UEs 108a-e may determine a value of the UE receive-transmit time difference (e.g., based on a downlink signal transmitted from the eNB 104a to the individual UE 108a-e and an uplink signal transmitted from the individual UE to the eNB 104a). The individual UEs 108a-e may transmit the value of the UE receive-transmit time difference to the eNB 104a. In some embodiments, the value of the UE receive-transmit time difference may be included in the same transmission that is used by the eNB 104a to calculate the AoA and/or Tadv for the UE 108a-e.

In various embodiments, the location distribution circuitry 236 may assign the individual UEs 108a-e to one of a plurality of bins to generate a UE location distribution. The individual bins of the plurality of bins may correspond to a range of values for the AoA and a range of values for the Tadv. Accordingly, the individual bins may indicate a physical location of the corresponding UEs within the cell 104a. The UE location distribution may indicate a number of UEs 108a-e in the cell 112a that are assigned to each bin.

Figure 5:
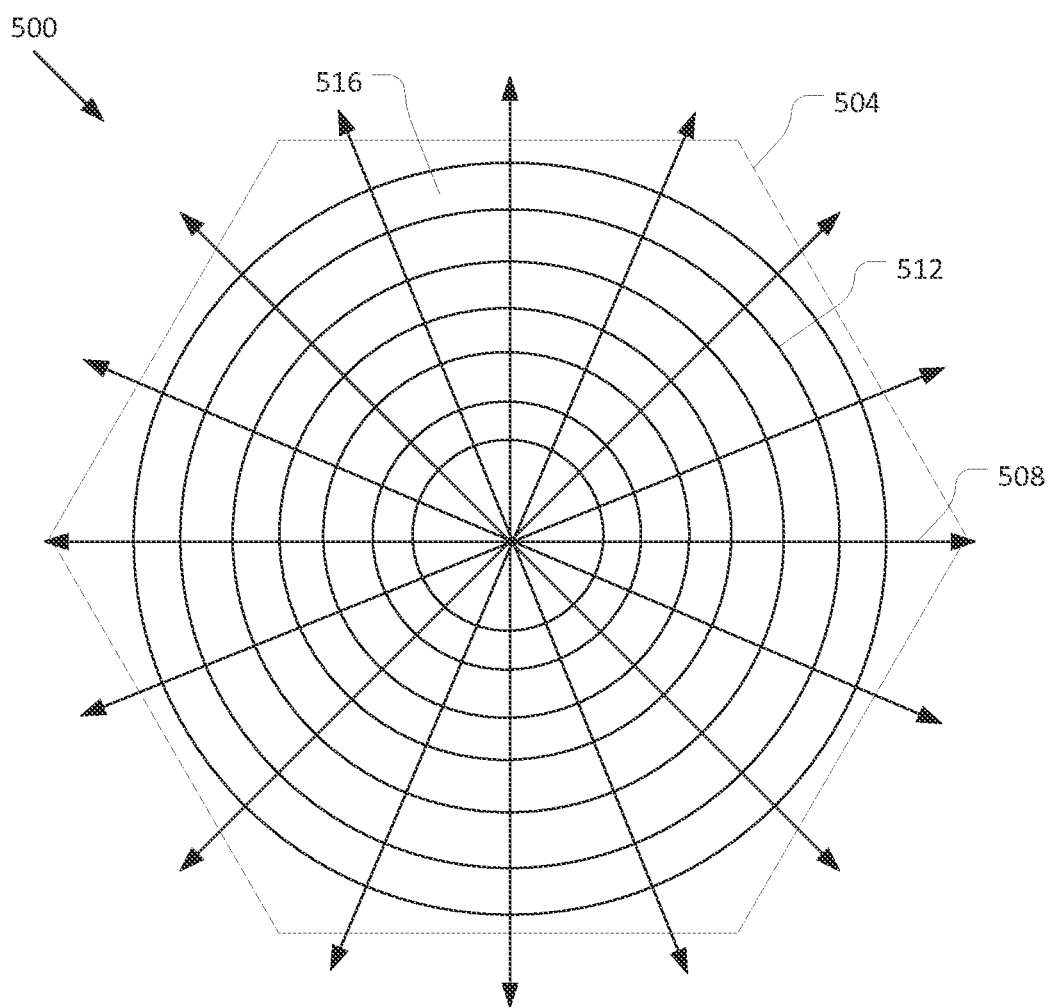
FIG. 5 illustrates a UE location distribution map in accordance with various embodiments.

For example, FIG. 5 illustrates a location distribution map 500 for a cell 504 in accordance with various embodiments. The location distribution map 500 includes AoA reference lines 508 corresponding to different AoA values and Tadv reference lines 512 corresponding to different Tadv values. The AoA reference lines 508 and Tadv reference lines 512 may define a plurality of bins 516. Individual bins 516 may correspond to a range of AoA values and a range of Tadv values. The UEs associated with the cell 504 may be assigned to individual bins 516 based on the AoA and Tadv associated with the respective UEs.

In various embodiments, any suitable number of bins 516 may be defined for the cell 504. Additionally, any suitable size of the range of AoA values (e.g., a difference between the AoA values of adjacent AoA reference lines 508 in the map 500) and any suitable size of the range of Tadv values (e.g., a difference between the Tadv values of adjacent Tadv reference lines 512 of the map 500) may be used to define the bins 516. In some embodiments, the sizes of the range of AoA values and/or the range of Tadv values may be different for some bins 516 than for other bins 516. In other embodiments, the sizes of the range of AoA values and the range of Tadv values may be the same for all the bins 516. It will be apparent that the AoA reference lines 508 and Tadv reference lines 512 are shown in FIG. 5 as examples, and other embodiments may include significantly more AoA reference lines 508 and/or Tadv reference lines 512 for the cell 504.

In one non-limiting embodiment, the size of the range of Tadv values for the individual bins 516 may be 2 Ts for Tadv values less than or equal to 4096 Ts, and may be 8 Ts for Tadv values greater than 4096 Ts. In some embodiments, the measurement range for Tadv values measured by the eNB for the cell 504 may be 0 to 49232 Ts.

In various embodiments, a radius, Rtadv, of the circle formed by the individual Tadv reference lines 512 may be equal to C×Tadv/2, where C is the speed of light and Tadv is the Tadv value to which the Tadv reference line 512 corresponds. Accordingly, for the example described above, for Tadv values from 0 to 4096 Ts, a width of each bin 516 (e.g., a distance between adjacent Tadv reference lines 512) may be equal to $(3\times10^8\times2/(15000\times2048))/2=9.77$ meters. For Tadv values from 4096 Ts to 49232 Ts, the width of each bin 516 may be equal to 39.06 meters.

Additionally, or alternatively, the range of AoA values for the individual bins 516 may have a size of 0.5 degrees. That is, a difference between the AoA values of adjacent AoA reference lines 508 may be 0.5 degrees. The measurement range for AoA values measured by the eNB for the cell 504 may be 0 to 360 degrees.

A length of each bin 516 (e.g., a distance between adjacent AoA reference lines 508 along an arc of the Tadv reference line 512 that forms the outer border of the bin 516) may be equal to Rtadv×2×π/(360×AoAres), where Rtadv is the radius of the circle formed by the reference line 512 that forms the outer border of the bin 512 and AoAres is the size of the range of AoA values for the individual bins 516 (e.g., 0.5 degrees in the above example). Accordingly, the length of the bin 516 may depend on the radius of the circle formed by the associated reference line 512. For a bin 516 with an Rtadv of 1000 meters and an AoAres of 0.5 degrees, the length of the bin 516 may be 1000×2×π/(360×0.5)=8.72 meters.

In various embodiments, the location distribution circuitry 236 may transmit the UE location distribution to the network management entity 116. The network management entity 116 may determine one or more parameters for the eNB 104a based on the location distribution (e.g., using the CCO function). The network management entity 116 may instruct the transceiver circuitry 224 to adjust one or more parameters for communications with the plurality of UEs 108a-e based on the UE location distribution. For example, in some embodiments, the one or more parameters may include a downlink transmit power, an antenna tilt, and/or an azimuth for transmissions by the eNB 104a.

In some embodiments, the management circuitry 464 of the network management entity 116 may additionally or alternatively adjust one or more parameters for communications by another eNB (e.g., eNB 104b and/or eNB 104c) based on the UE location distribution received from the eNB 104a. The one or more parameters of the other eNB may be adjusted, for example, to account for the adjusted parameters of the eNB 104a to facilitate delivery of network services to the UEs 108a-j associated with the network 100. In some cases, the one or more parameters may be adjusted to cause one or more of the UEs 108a-j to switch from being connected to one eNB 104a-c to being connected to another eNB 104a-c of the network 100.

In some embodiments, the management circuitry 464 may activate another eNB responsive to the UE location distribution received from the eNB 104a. The activated eNB may, for example, provide network services in a cell that overlaps with the cell 112a of the eNB 104a. Accordingly, the activated eNB may lessen the load of the eNB 104a.

In some embodiments, the network management entity 116 may receive UE location distributions from a plurality of eNBs (e.g., eNBs 104a-c). The management circuitry 464 may determine one or more parameters for the individual eNBs 104a-c based on the CCO function using the UE location distributions. Accordingly, the network management entity 116 may account for the distribution of UEs 108a-j across the network 100 when determining the parameters of the individual eNBs 104a-c in order to facilitate delivery of network services to the UEs 108a-j.

In some embodiments, the individual UEs 108a-e may determine a reference signal received power (RSRP) and/or a reference signal received quality (RSRQ) based on a reference signal transmitted by the eNB 104a and received by the individual UE 108a-e. For example, the RSRP and/or RSRQ may be determined by the feedback circuitry of the respective UE 108a-e (e.g., the feedback circuitry 352 of the UE 108a). The individual UEs 108a-e may transmit the RSRP and/or RSRQ to the eNB 104a. In some embodiments, the RSRP and/or RSRQ may be included in the same transmission that is used by the eNB 104a to calculate the AoA and/or Tadv for the UE 108a-e. The one or more parameters adjusted by the transceiver circuitry 224 may be based further on the RSRPs and/or RSRQs reported by the UEs 108a-e of the cell 112a.

In some embodiments, the location distribution circuitry 236 may determine an average RSRP and/or an average RSRQ reported by the UEs 108a-e associated with each bin. The location distribution circuitry 236 may send the average RSRP and/or average RSRQ for each bin to the network management entity 116. The network management entity 116 may determine the one or more parameters for the eNB 104a based further on the average RSRP and/or RSRQ for the individual bins. Alternatively, or additionally, the location distribution circuitry 236 may send the individual RSRPs and/or RSRQs reported by the UEs 108a-e to the network management entity 116.

Figure 6:
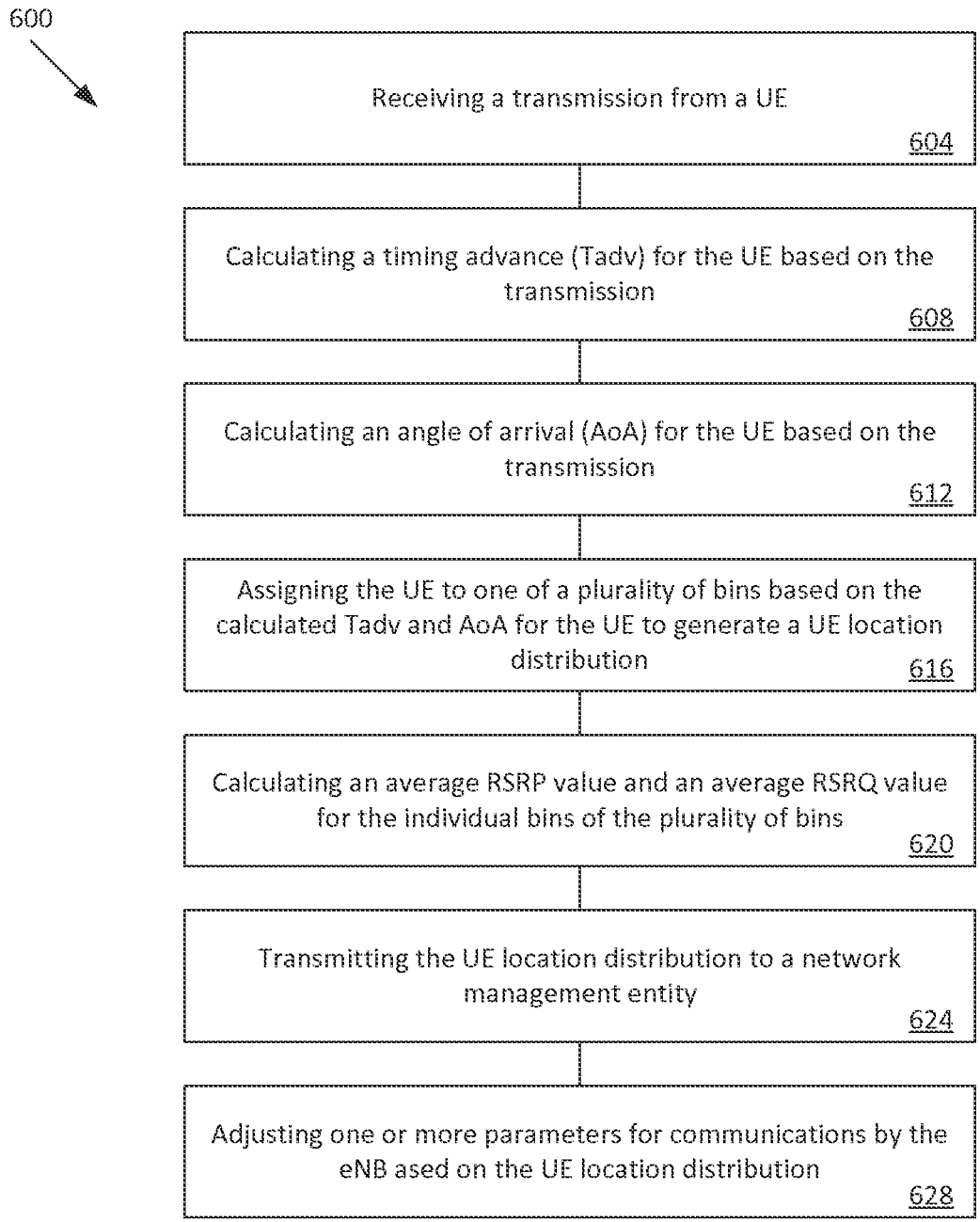
FIG. 6 illustrates a method to be employed by an eNB in accordance with various embodiments.

FIG. 6 illustrates a method 600 that may be performed by an eNB (e.g., eNB 104a) in accordance with various embodiments. In some embodiments, the eNB may include one or more tangible computer-readable media having instructions, stored thereon, that when executed cause the eNB to perform method 600.

At 604, the method 600 may include receiving a transmission from a UE (e.g., UE 108a-e). In some embodiments, the transmission may include an RSRP, an RSRQ, and/or a UE receive-transmit time difference for the UE.

At 608, the method 600 may include calculating a Tadv for the UE based on the transmission. In some embodiments, the Tadv may be equal to an eNB receive-transmit time difference that is associated with the UE. The eNB receive-transmit time difference may be determined by the eNB. In other embodiments, the Tadv for the UE may be equal to the sum of the eNB receive-transmit time difference and the UE receive-transmit time difference.

At 612, the method 600 may include calculating an AoA for the UE based on the transmission.

At 616, the method 600 may include assigning the UE to one of a plurality of bins based on the calculated Tadv and AoA for the UE. The individual bins may correspond to a range of values for the Tadv and a range of values for the AoA. In some embodiments, the eNB may assign the UE to one of a plurality of bins by incrementing a counter associated with the bin. For example, a counter ueNum[i,j] may be incremented, where i is a Tadv index that corresponds to a range of Tadv values and j is an AoA index that corresponds to a range of AoA values for the associated bin. The eNB may maintain a plurality of counters ueNum[i,j] to track the number of UEs associated with respective bins.

In various embodiments, the eNB may repeat blocks 604, 608, 612, and 616 of method 600 for a plurality of UEs. For example, the eNB may perform the blocks 604, 608, 612, and 616 for all the UEs that are in a connected mode with the eNB. Accordingly, the eNB may generate a UE location distribution that indicates how many UEs connected with the eNB are assigned to each bin of the plurality of bins.

At 620, the method 600 may include calculating an average RSRP and/or an average RSRQ for the individual bins of the plurality of bins. The average RSRP may be equal to a total of the RSRP values reported by the UEs associated with the bin divided by the number of UEs associated with the bin. The average RSRQ may be equal to a total of the RSRQ values reported by the UEs associated with the bin divided by the number of UEs associated with the bin. In some embodiments, the eNB may maintain a total RSRP and/or a total RSRQ for the bin, and may update the total RSRP and/or total RSRQ as the RSRP values and/or RSRQ values, respectively, are received.

At 624, the method 600 may further include transmitting the UE location distribution to a network management entity (e.g., network management entity 116). In some embodiments, the eNB may additionally transmit the average RSRP values for the individual bins, and/or the average RSRQ value for the individual bins to the network management entity.

At 628, the method 600 may include adjusting one or more parameters for communications by the eNB based on the UE location distribution, average RSRP values, and/or average RSRQ values. In some embodiments, the eNB may receive the one or more adjusted parameters from the network management entity. The network management entity may determine the one or more parameters using, for example, a CCO function.

Figure 7:
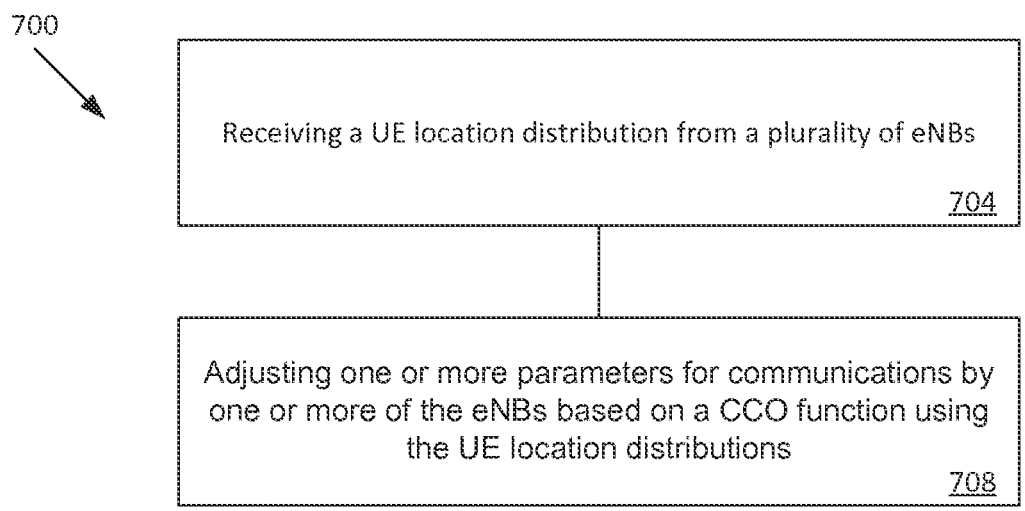
FIG. 7 illustrates a method to be employed by a network management entity in accordance with various embodiments.

In various embodiments, the eNB may repeat the method 600 (e.g., periodically) to update the UE location distribution, RSRP values, and/or RSRQ values. Accordingly, the method 600 may allow the eNB and/or network management entity to adapt to changing network conditions. In various embodiments, the counters maintained by the eNB for the method 600 may be reset prior to repeating the method 600. For FIG. 7 illustrates a method 700 that may be performed by a network management entity (e.g., network management entity 116) in accordance with various embodiments. In some embodiments, the network management entity may include one or more tangible computer-readable media having instructions, stored thereon, that when executed cause the network management entity to perform method 700.

At 704, the method 700 may include receiving a UE location distribution from a plurality of eNBs (e.g., eNBs 104a-c). The UE location distribution may indicate a number of UEs, of a plurality of UEs in a connected mode with the eNB, that are included in individual bins of a plurality of bins associated with a cell serviced by the eNB. The individual bins may correspond to a range of values for an AoA and a range of values for a Tadv associated with individual UEs of the plurality of UEs. Accordingly, the individual bins may indicate a physical location of the corresponding UEs within the cell.

At 708, the method 700 may include adjusting one or more parameters for communications by one or more of the eNBs based on a CCO function using the UE location distributions. The network management entity may determine the one or more parameters using the CCO function and transmit the one or more parameters to the corresponding eNBs.

In some embodiments, the network management entity may additionally receive RSRP information and/or RSRQ information associated with the individual bins. The RSRP information and/or RSRQ information may include, for example, an average RSRP value and/or an average RSRQ value, respectively, for UEs associated with the bin. The CCO employed by the network management entity may further use the RSRP information and/or RSRQ information to adjust the one or more parameters for communications by one or more of the eNBs.

Figure 8:
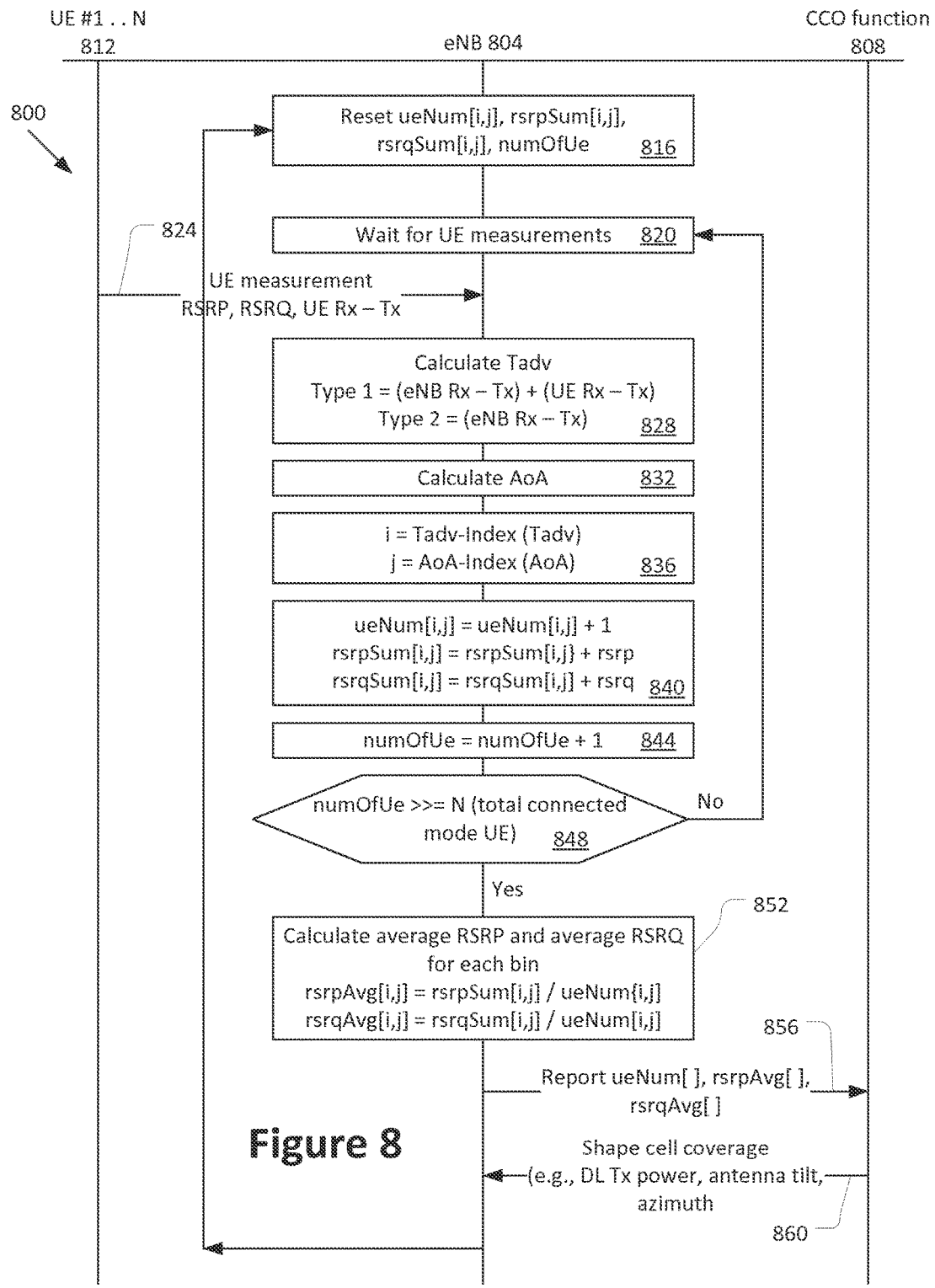
FIG. 8 illustrates a flow chart of a method for generating and using a UE location distribution in accordance with various embodiments.

FIG. 8 illustrates a flow diagram of a method 800 in accordance with various embodiments. In some embodiments, the method 800 may provide a specific example of the method 600 and/or method 700 described above. The method 800 may be performed by an eNB 804 (e.g., eNB 104a) in cooperation with a CCO function 808 and a plurality of UEs 812 (e.g., UEs 108a-e). The CCO function 808 may be implemented by a network management entity (e.g., network management entity 116). The network management entity may be included in a separate device from the eNB 804 or in the eNB 804. The UEs 812 may be in a connected mode with the eNB 804, and may be associated with a same cell for which the eNB 804 provides network services (e.g., a connection to a RAN).

At 816 of the method 800, the eNB 804 may reset (e.g., set to a value of NULL or 0) counters ueNum[i,j], rsrpSum[i,j], rsrqSum[i,j], and numOfUe. The ueNum[i,j] counter may correspond to a number of UEs that are assigned to the bin with a Tadv index of i and a AoA index of j. The Tadv index may correspond to a range of Tadv values and the AoA index may correspond to a range of AoA values for the associated bin, as further discussed elsewhere herein. The rsrpSum[i,j] counter may correspond to a sum of the RSRP values reported by the UEs of the bin with the Tadv index of i and the AoA index of j. The rsrqSum[i,j] counter may correspond to a sum of the RSRQ values reported by the UEs of the bin with the Tadv index of i and the AoA index of j. The eNB 804 may maintain separate counters ueNum[i,j], rsrpSum[i,j], and rsrqSum[i,j] for each bin. The numOfUe counter may track the number of UEs 812 for which the eNB 804 has received UE measurements (e.g., RSRP, RSRQ, and/or UE receive-transmit time difference) since the last reset of the counters, as further discussed below.

At 820 of the method 800, the eNB 804 may wait and/or monitor for UE measurements from the UEs 812. At 824 of the method 800, the eNB 804 may receive UE measurements from one of the UEs 812. The UE measurements may include an RSRP, an RSRQ, and a UE receive-transmit time difference measured by the UE.

At 828 of the method 800, the eNB 804 may calculate the Tadv for the UE. The Tadv may be a Type 1 Tadv equal to the sum of the eNB receive-transmit time difference and the UE receive-transmit time difference or a Type 2 Tadv equal to the eNB receive-transmit time difference.

At 832 of the method 800, the eNB 804 may calculate the AoA for the UE.

At 836 of the method 800, the eNB 804 may compute a Tadv index and an AoA index for the UE. The AoA index may be computed based on the AoA calculated at 832 of the method 800 according to Table 1 below. The Tadv index may be computed based on the Tadv calculated at 828 of the method 800 according to Table 2 below.

TABLE 1

| Reported value of AoA index | Measured value of AoA (degrees) |
| --- | --- |
| AOA_ANGLE_000 | 0 ≤ AOA_ANGLE < 0.5 |
| AOA_ANGLE_001 | 0.5 ≤ AOA_ANGLE < 1 |
| AOA_ANGLE_002 | 1 ≤ AOA_ANGLE < 1.5 |
| ... | ... |
| AOA_ANGLE_717 | 358.5 ≤ AOA_ANGLE < 359 |
| AOA_ANGLE_718 | 359 ≤ AOA_ANGLE < 359.5 |
| AOA_ANGLE_719 | 359.5 ≤ AOA_ANGLE < 360 |

TABLE 2

| Reported value of Tadv index | Measured value of Tadv (Ts) |
| --- | --- |
| TIME_ADVANCE_00 | Tadv < 2 |
| TIME_ADVANCE_01 | 2 ≤ Tadv < 4 |
| TIME_ADVANCE_02 | 4 ≤ Tadv < 6 |
| ... | ... |
| TIME_ADVANCE_2046 | 4092 ≤ Tadv < 4094 |
| TIME_ADVANCE_2047 | 4094 ≤ Tadv < 4096 |
| TIME_ADVANCE_2048 | 4096 ≤ Tadv < 4104 |
| TIME_ADVANCE_2049 | 4104 ≤ Tadv < 4112 |
| ... | ... |
| TIME_ADVANCE_7688 | 49216 ≤ Tadv < 49224 |
| TIME_ADVANCE_7689 | 49224 ≤ Tadv < 49232 |
| TIME_ADVANCE_7690 | 49232 ≤ Tadv |

At 840 of the method 800, the eNB 804 may increment the ueNum[i,j] by one for the bin associated with the computed Tadv index and AoA index. Accordingly, the UE may be assigned to the bin according to the computed Tadv index and AoA index. The eNB 804 may also add the RSRP received from the UE to the rsrpSum[i,j] counter associated with the bin, and add the RSRQ received from the UE to the rsrqSum[i,j] counter associated with the bin.

At 844 of the method 800, the eNB 804 may increment the numOfUE counter by one. At 848 of the method 800, the eNB 804 may determine if the value of the numOfUe counter is greater than or equal to N, where N is the number of UEs 812 that are in connected mode with the eNB 804. If the value of the numOfUE counter is less than N, the eNB may return to block 820 of the method 800 and repeat blocks 820, 824, 832, 836, 840, and 844 for additional UEs 812. If the value of the numOfUE counter is greater than or equal to N, the eNB 804 may proceed to block 852 of the method 800. Accordingly, block 848 of method 800 may facilitate the eNB 804 to ensure that UE measurements from all of the connected mode UEs 812 have been received and processed by the eNB 804.

At 852 of the method 800, the eNB 804 may calculate the average RSRP and average RSRQ for each bin. The average RSRP, rsrpAvg[i,j], may be equal to a value of the rsrpSum[i,j] counter (e.g., the sum of the RSRPs reported by all of the UEs of the bin) divided by the value of the ueNum[i,j] counter (e.g., the total number of UEs in the bin). The average RSRQ, rsrqAvg[i,j], may be equal to a value of the rsrqSum[i,j] counter (e.g., the sum of the RSRQs reported by all of the UEs of the bin) divided by the value of the ueNum[i,j] counter (e.g., the total number of UEs in the bin).

At 856 of the method 800, the eNB 804 may report the value of the ueNum[i,j] counter for each bin (e.g., the UE location distribution), and the average RSRP and average RSRQ for each bin to the CCO function 808. At 860 of the method 800, the CCO function 808 may adjust one or more parameters of the eNB 804 to reshape cell coverage based on the UE location distribution, the average RSRP values and/or the average RSRQ values. For example, the CCO function 808 may adjust the downlink transmit power, antenna tilt, and/or azimuth of the eNB 804. The CCO function 808 may send the one or more adjusted parameters to the eNB 804.

In various embodiments, the eNB 804 may repeat the method 800 (e.g., periodically) to update the UE location distribution, RSRP values, and/or RSRQ values. Accordingly, the method 600 may allow the eNB and/or network management entity to adapt to changing network conditions.

Figure 9:
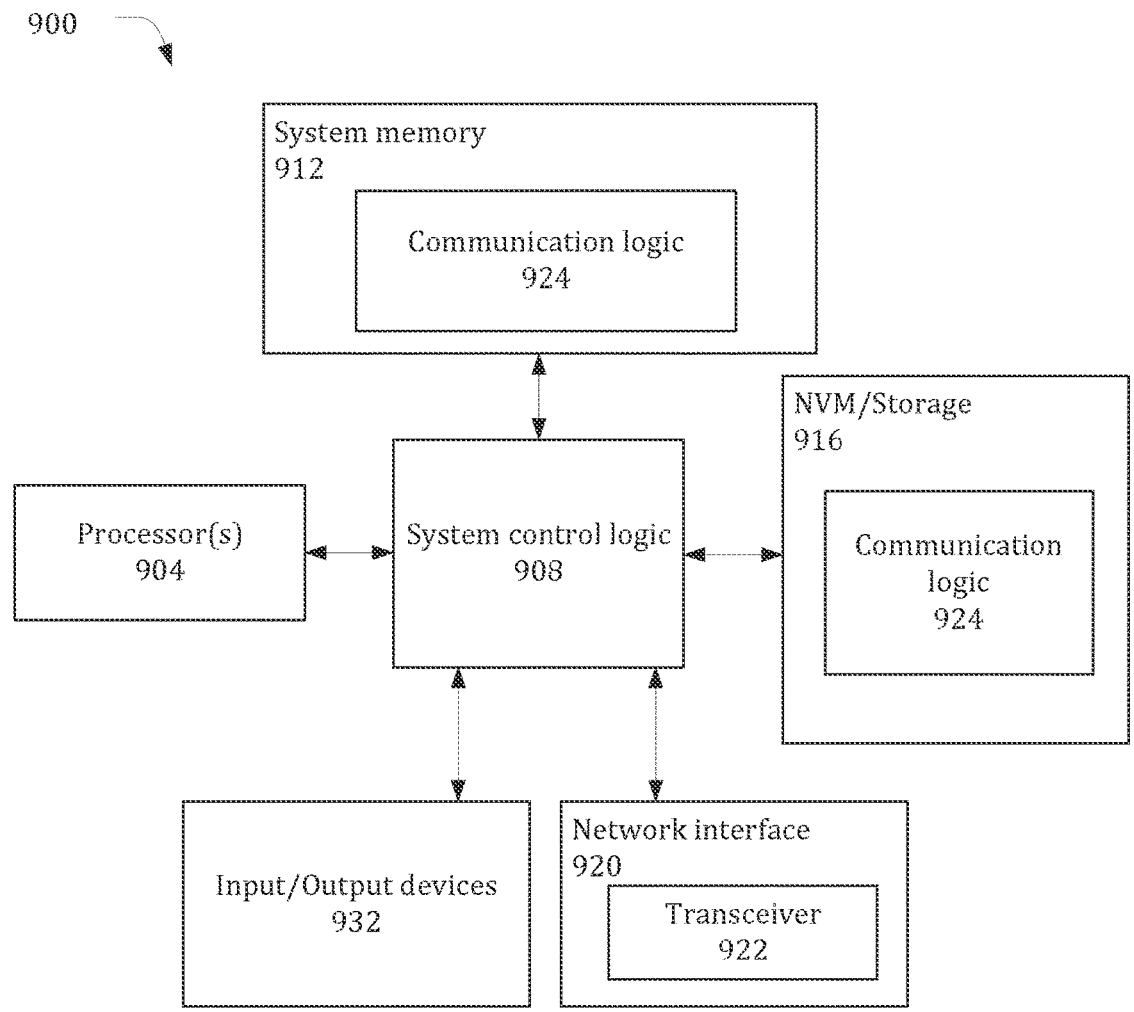
FIG. 9 schematically illustrates an example system that may be used to practice various embodiments described herein.

The eNBs 104a-c, UEs 108a-j, and network management entity 116 described herein may be implemented into a system using any suitable hardware and/or software to configure as desired. FIG. 9 illustrates, for one embodiment, an example system 900 comprising one or more processor(s) 904, system control logic 908 coupled with at least one of the processor(s) 904, system memory 912 coupled with system control logic 908, non-volatile memory (NVM)/storage 916 coupled with system control logic 908, a network interface 920 coupled with system control logic 908, and input/output (I/O) devices 932 coupled with system control logic 908.

The processor(s) 904 may include one or more single-core or multi-core processors. The processor(s) 904 may include any combination of general-purpose processors and dedicated processors (e.g., graphics processors, application processors, baseband processors, etc.).

System control logic 908 for one embodiment may include any suitable interface controllers to provide for any suitable interface to at least one of the processor(s) 904 and/or to any suitable device or component in communication with system control logic 908.

System control logic 908 for one embodiment may include one or more memory controller(s) to provide an interface to system memory 912. System memory 912 may be used to load and store data and/or instructions, e.g., communication logic 924. System memory 912 for one embodiment may include any suitable volatile memory, such as suitable dynamic random access memory (DRAM), for example.

NVM/storage 916 may include one or more tangible, non-transitory computer-readable media used to store data and/or instructions, e.g., communication logic 924. NVM/storage 916 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 916 may include a storage resource physically part of a device on which the system 900 is installed or it may be accessible by, but not necessarily a part of, the device. For example, the NVM/storage 916 may be accessed over a network via the network interface 920 and/or over Input/Output (I/O) devices 932.

The communication logic 924 may include instructions that, when executed by one or more of the processors 904, cause the system 900 to perform operations associated with the components of the communication device 220, 340, or 456 and/or the methods 600, 700, or 800 as described with respect to the above embodiments. In various embodiments, the communication logic 924 may include hardware, software, and/or firmware components that may or may not be explicitly shown in system 900.

Network interface 920 may have a transceiver 922 to provide a radio interface for system 900 to communicate over one or more network(s) and/or with any other suitable device. In various embodiments, the transceiver 922 may be integrated with other components of system 900. For example, the transceiver 922 may include a processor of the processor(s) 904, memory of the system memory 912, and NVM/Storage of NVM/Storage 916. Network interface 920 may include any suitable hardware and/or firmware. Network interface 920 may include a plurality of antennas to provide a multiple input, multiple output radio interface. Network interface 920 for one embodiment may include, for example, a wired network adapter, a wireless network adapter, a telephone modem, and/or a wireless modem.

For one embodiment, at least one of the processor(s) 904 may be packaged together with logic for one or more controller(s) of system control logic 908. For one embodiment, at least one of the processor(s) 904 may be packaged together with logic for one or more controllers of system control logic 908 to form a System in Package (SiP). For one embodiment, at least one of the processor(s) 904 may be integrated on the same die with logic for one or more controller(s) of system control logic 908. For one embodiment, at least one of the processor(s) 904 may be integrated on the same die with logic for one or more controller(s) of system control logic 908 to form a System on Chip (SoC).

In various embodiments, the I/O devices 932 may include user interfaces designed to enable user interaction with the system 900, peripheral component interfaces designed to enable peripheral component interaction with the system 900, and/or sensors designed to determine environmental conditions and/or location information related to the system 900.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 920 to communicate with components of a positioning network, e.g., a global positioning system (GPS) satellite.

In various embodiments, the system 900 may be a mobile computing device such as, but not limited to, a laptop computing device, a tablet computing device, a netbook, a smartphone, etc. In various embodiments, system 900 may have more or less components, and/or different architectures.

Various non-limiting Examples are provided below.

Example 1 is a method to facilitate communications by an evolved Node B (eNB), the method comprising: determining an angle of arrival associated with individual user equipments (UEs) of a plurality of UEs in a connected mode with the eNB; determining a timing advance associated with the individual UEs; estimating a UE location of the individual UEs based on the respective angle of arrival and timing advance; obtaining a UE location distribution for the plurality of UEs based on the estimated UE locations of the plurality of UEs; and adjusting one or more parameters for communications by the eNB based on the UE location distribution.

Example 2 is the method of Example 1, wherein obtaining the UE location distribution includes assigning the individual UEs to one of a plurality of bins, individual bins of the plurality of bins corresponding to a range of values for the angle of arrival and a range of values for the timing advance.

Example 3 is the method of Example 2, further comprising: receiving a reference signal received power (RSRP) measurement or a reference signal received quality (RSRQ) measurement from the individual UEs; and adjusting the one or more parameters for communications by the eNB based further on the RSRP measurements or RSRQ measurements for the plurality of UEs.

Example 4 is the method of Example 3, further comprising averaging the RSRP measurements or RSRQ measurements for all UEs assigned to a same bin of the plurality of bins.

Example 5 is the method of Example 1, wherein the one or more parameters include a downlink transmit power, an antenna tilt, or an azimuth for transmissions by the eNB.

Example 6 is the method of any one of Examples 1 to 5, wherein the eNB is a first eNB, and wherein the method further comprises adjusting one or more parameters for communications by a second eNB responsive to the one or more adjusted parameters for communications by the first eNB.

Example 7 is the method of Example 1, wherein the method is performed by the eNB.

Example 8 is the method of Example 1, wherein the method is performed by a network management entity that manages a plurality of eNBs including the eNB, and wherein the network management entity is to adjust the one or more parameters for communications by the eNB based on a capacity and coverage optimization function that uses the UE location distribution.

Example 9 is an apparatus to be employed by an evolved Node B (eNB), the apparatus comprising: transceiver circuitry to wirelessly communicate with a plurality of user equipments (UEs) within a cell; measurement circuitry coupled to the transceiver circuitry, the measurement circuitry to measure an angle of arrival and a timing advance associated with individual UEs of the plurality of UEs in the cell; and location distribution circuitry to assign the individual UEs to one of a plurality of bins to generate a UE location distribution, individual bins of the plurality of bins corresponding to a range of values for the angle of arrival and a range of values for the timing advance to indicate a physical location of the corresponding UEs within the cell.

Example 10 is the apparatus of Example 9, wherein the location distribution circuitry is to transmit the UE location distribution to a network management entity that manages a plurality of eNBs.

Example 11 is the apparatus of Example 9, wherein the transceiver circuitry is further to adjust one or more parameters for communications with the plurality of UEs based on the UE location distribution.

Example 12 is the apparatus of Example 11, wherein the one or more parameters include a downlink transmit power, an antenna tilt, or an azimuth for transmissions by the eNB.

Example 13 is the apparatus of any one of Examples 9 to 12, wherein the location distribution circuitry is further to: receive a reference signal received power (RSRP) measurement or a reference signal received quality (RSRQ) measurement from the individual UEs; and calculate an average RSRP measurement or an average RSRQ measurement for all UEs assigned to a same bin of the plurality of bins.

Example 14 is the apparatus of Example 9, wherein the timing advance corresponds to a sum of an eNB receive-transmit time difference and a UE receive-transmit time difference.

Example 15 is the apparatus of Example 9, wherein the timing advance corresponds to an eNB receive-transmit time difference.

Example 16 is an eNB including the apparatus of Example 9, and further including an Ethernet interface.

Example 17 is one or more non-transitory computer-readable media having instructions, stored thereon, that when executed cause a computing system to: receive a UE location distribution that indicates a number of UEs, of a plurality of UEs in a connected mode with an evolved Node B (eNB), that are included in individual bins of a plurality of bins associated with a cell serviced by the eNB, wherein the individual bins correspond to a range of values for an angle of arrival and a range of values for a timing advance associated with individual UEs of the plurality of UEs to indicate a physical location of the corresponding UEs within the cell; and adjust one or more parameters for communications between the eNB and the plurality of UEs based on a capacity and coverage optimization (CCO) function using the UE location distribution.

Example 18 is the one or more media of Example 17, wherein the UE location distribution further includes reference signal received power (RSRP) information and reference signal received quality (RSRQ) information associated with individual bins of the plurality of bins.

Example 19 is the one or more media of Example 18, wherein the RSRP information indicates an average RSRP measurement for all UEs included in a same bin of the plurality of bins.

Example 20 is the one or more media of Example 17, wherein the one or more parameters include a downlink transmit power, an antenna tilt, or an azimuth for transmissions by the eNB.

Example 21 is the one or more media of Example 17, wherein the instructions, when executed, further cause the computing system to adjust one or more parameters of another eNB based on the UE location distribution.

Example 22 is the one or more media of any one of Examples 17 to 21, wherein the eNB is a first eNB, wherein the UE location distribution is a first UE location distribution associated with the first eNB, and wherein the instructions, when executed, further cause the computing system to: receive a plurality of UE location distributions associated with respective eNBs; and adjust one or more parameters for the plurality of eNBs based on the CCO function using the plurality of UE location distributions.

Example 23 is the one or more media of any one of Examples 17 to 21, wherein the computing system is a network management entity and wherein the UE location distribution is received from the eNB.

Example 24 is an apparatus to facilitate communications by an evolved Node B (eNB), the apparatus comprising: means to receive a UE location distribution that indicates a number of UEs, of a plurality of UEs in a connected mode with an evolved Node B (eNB), that are included in individual bins of a plurality of bins associated with a cell serviced by the eNB, wherein the individual bins correspond to a range of values for an angle of arrival and a range of values for a timing advance associated with individual UEs of the plurality of UEs to indicate a physical location of the corresponding UEs within the cell; and means to adjust one or more parameters for communications between the eNB and the plurality of UEs based on a capacity and coverage optimization (CCO) function using the UE location distribution.

Example 25 is the apparatus of Example 24, wherein the UE location distribution further includes reference signal received power (RSRP) information and reference signal received quality (RSRQ) information associated with individual bins of the plurality of bins.

Example 26 is the apparatus of Example 25, wherein the RSRP information indicates an average RSRP measurement for all UEs included in a same bin of the plurality of bins.

Example 27 is the apparatus of Example 24, wherein the one or more parameters include a downlink transmit power, an antenna tilt, or an azimuth for transmissions by the eNB.

Example 28 is the apparatus of Example 24, wherein the instructions, when executed, further cause the computing system to adjust one or more parameters of another eNB based on the UE location distribution.

Example 29 is the apparatus of any one of Examples 24 to 28, wherein the eNB is a first eNB, wherein the UE location distribution is a first UE location distribution associated with the first eNB, and wherein the instructions, when executed, further cause the computing system to: receive a plurality of UE location distributions associated with respective eNBs; and adjust one or more parameters for the plurality of eNBs based on the CCO function using the plurality of UE location distributions.

Example 30 is the apparatus of any one of Examples 24 to 28, wherein the computing system is a network management entity and wherein the UE location distribution is received from the eNB.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method to facilitate communications by an evolved Node B (eNB), the method comprising:

determining an angle of arrival associated with individual user equipments (UEs) of a plurality of UEs in a connected mode with the eNB;

determining a timing advance associated with the individual UEs;
estimating a UE location of the individual UEs within a coverage area of the eNB based on the respective angle of arrival and timing advance;
assigning the individual UEs to one of a plurality of bins, individual bins of the plurality of bins corresponding to a range of values for the angle of arrival and a range of values for the timing advance;
averaging reference signal received power (RSRP) measurements or reference signal received quality (RSRQ) measurements received from a plurality of the individual UEs assigned to a same individual bin to obtain an average RSRP measurement or an average RSRQ measurement for the respective individual bin; and
adjusting, in accordance with a capacity and coverage optimization (CCO) function, one or more parameters for communications by the eNB based on the average RSRP measurements or average RSRQ measurements for respective individual bins of the plurality of bins.

2. The method of claim 1, wherein the one or more parameters include an antenna tilt or an azimuth for transmissions by the eNB.

3. The method of claim 1, wherein the eNB is a first eNB, and wherein the method further comprises adjusting one or more parameters for communications by a second eNB responsive to the one or more adjusted parameters for communications by the first eNB.

4. The method of claim 1, wherein the method is performed by the eNB.

5. The method of claim 1, wherein the method is performed by a network management entity that manages a plurality of eNBs including the eNB.

6. An apparatus to be employed by an evolved Node B (eNB), the apparatus comprising:
transceiver circuitry to wirelessly communicate with a plurality of user equipments (UEs) within a cell;
measurement circuitry coupled to the transceiver circuitry, the measurement circuitry to measure an angle of arrival and a timing advance associated with individual UEs of the plurality of UEs in the cell; and
location distribution circuitry to:
assign the individual UEs to one of a plurality of bins to generate a UE location distribution, individual bins of the plurality of bins corresponding to a range of values for the angle of arrival and a range of values for the timing advance to indicate a physical location of the corresponding UEs within the cell;
receive a reference signal received power (RSRP) measurement or a reference signal received quality (RSRQ) measurement from the individual UEs; and
calculate an average RSRP measurement or an average RSRQ measurement for all UEs assigned to a same bin of the plurality of bins, wherein the UE location distribution includes the average RSRP measurements or average RSRQ measurements for the respective bins;
wherein the transceiver circuitry is further to adjust, based on a capacity and coverage optimization (CCO) function, one or more parameters for communications with the plurality of UEs based on the UE location distribution.

7. The apparatus of claim 6, wherein the location distribution circuitry is to transmit the UE location distribution to a network management entity that manages a plurality of eNBs.

8. The apparatus of claim 6, wherein the one or more parameters include an antenna tilt or an azimuth for transmissions by the eNB.

9. The apparatus of claim 6, wherein the timing advance corresponds to a sum of an eNB receive-transmit time difference and a UE receive-transmit time difference.

10. The apparatus of claim 6, wherein the timing advance corresponds to an eNB receive-transmit time difference.

11. An eNB including the apparatus of claim 6, and further including an Ethernet interface.

12. The apparatus of claim 6, wherein the UE location distribution further includes an indicator of a number of the UEs assigned to the same bin.

13. One or more non-transitory computer-readable media having instructions, stored thereon, that when executed cause a computing system to:
receive a user equipment (UE) location distribution that indicates a number of UEs, of a plurality of UEs in a connected mode with an evolved Node B (eNB), that are included in a same individual bin of a plurality of bins associated with a cell serviced by the eNB, wherein the individual bins correspond to a range of values for an angle of arrival and a range of values for a timing advance associated with individual UEs of the plurality of UEs to indicate a physical location of the corresponding UEs within the cell, wherein the UE location distribution further includes reference signal received power (RSRP) information and reference signal received quality (RSRQ) information associated with individual bins of the plurality of bins, and wherein the RSRP information indicates an average RSRP measurement for all UEs included in a same bin of the plurality of bins; and
adjust one or more parameters for communications between the eNB and the plurality of UEs based on a capacity and coverage optimization (CCO) function using the UE location distribution.

14. The one or more media of claim 13, wherein the one or more parameters include an antenna tilt or an azimuth for transmissions by the eNB.

15. The one or more media of claim 13, wherein the instructions, when executed, further cause the computing system to adjust one or more parameters of another eNB based on the UE location distribution.

16. The one or more media of claim 13, wherein the eNB is a first eNB, wherein the UE location distribution is a first UE location distribution associated with the first eNB, and wherein the instructions, when executed, further cause the computing system to:
receive a plurality of UE location distributions associated with respective eNBs; and
adjust one or more parameters for the plurality of eNBs based on the CCO function using the plurality of UE location distributions.

17. The one or more media of claim 13, wherein the computing system is a network management entity and wherein the UE location distribution is received from the eNB.

* * * * *